United States Patent [19]
Roth

[11] Patent Number: 4,707,594
[45] Date of Patent: Nov. 17, 1987

[54] UNITARY, SELF-CONTAINED CONSUMER TRANSACTION CARD

[75] Inventor: Gary L. Roth, Elizabeth, Colo.

[73] Assignee: Intellicard International, Inc., Colorado Springs, Colo.

[21] Appl. No.: 750,489

[22] Filed: Jun. 27, 1985

[51] Int. Cl.$^4$ ............... G06K 19/02; G06K 19/08
[52] U.S. Cl. .................. 235/488; 235/492; 235/380
[58] Field of Search ............. 235/488, 490, 492, 487, 235/380; 101/DIG. 18; 400/127; 156/219, 220; 264/293; 283/904

[56] References Cited

U.S. PATENT DOCUMENTS

| | | | |
|---|---|---|---|
| 4,222,516 | 9/1980 | Badet et al. | 235/487 |
| 4,298,793 | 11/1981 | Melis et al. | 235/488 |
| 4,353,064 | 10/1982 | Stamm | 235/380 |
| 4,507,346 | 3/1985 | Maurer et al. | 283/904 |
| 4,568,824 | 2/1986 | Gareis et al. | 235/487 |
| 4,589,687 | 5/1986 | Hannon | 283/904 |
| 4,614,861 | 9/1986 | Pavlov et al. | 235/380 |
| 4,626,669 | 12/1986 | Davis et al. | 235/380 |

Primary Examiner—Raymond F. Cardillo
Assistant Examiner—Robert A. Weinhardt
Attorney, Agent, or Firm—Dorr, Carson, Sloan & Peterson

[57] ABSTRACT

An improved unitary, self-contained consumer transaction card having an outer support frame, an internally positioned printed circuit board, and top and bottom label sheets. The outer support frame provides structural support to the card and minimizes the flow of adhesives located under the top and bottom sheets out from the card. Backfill material inserted on the underside of the bottom label sheet and into the embossed consumer information provides structural strength to the embossed consumer information to prevent damage when the card is used.

9 Claims, 11 Drawing Figures

UNITARY, SELF-CONTAINED CONSUMER TRANSACTION CARD

BACKGROUND OF THE INVENTION

1. Field of Invention

The present invention pertains generally to consumer transaction cards and, more particularly, to the construction of a unitary, self-contained consumer transaction card.

2. Discussion of the Background of the Invention

The use of consumer transaction cards has increased greatly in the past few years. Such transaction cards have been employed as credit cards, debit cards, access control cards to control security by limiting access to designated areas, identification cards, automatic teller machine cards for obtaining money from currency dispensing machines, and the like. An example of such a card is presented in "A Unitary, Self-Contained Card Verification and Validation System and Method", Ser. No. 671,748, filed Nov. 15, 1984 issued on Sept. 30, 1986, as U.S. Pat. No. 4,614,861 and commonly assigned with the present invention. A number of prior art patented approaches are set forth and discussed in that application.

A number of calculators have been recently constructed that are approximately the same size as a credit card, but of greater thickness than a credit card. The K-MART (Model KMC 3) and IMA calculators (Models LC-672 and LC-682) utilize a metal center support having a rectangular frame and internal partitions to support and shield the calculator electronics and a metallized (or metal) rear layer to provide electrostatic shielding. The metal and plastic supports are in addition to the printed circuit card holding the display and electronics. Likewise, the EPSON and Radio Shack (Casio SL-750) calculators have a plastic center support having a rectangular frame and internal partitions for supporting and shielding the electronics with a metallize layer for shielding. The IMA models further use a separate outer frame around the periphery of the calculator.

The present invention improves upon the above approaches and provides a card construction for unitary, self-contained transaction cards of the type disclosed in the above-identified application and may have application to other consumer transaction cards.

SUMMARY OF THE INVENTION

The problems encountered in designing consumer transaction cards are to provide sufficient rigidity to the card while at the same time providing a simplified construction that is enduring and does not pose an inconvenience to consumers. Additionally, the elimination of layers such as the metallized layer or the frames with internal supports would greatly reduce the cost of construction and of thickness to the card. Since the various layers of such a card may be glued or otherwise affixed together, it is desirable to provide a card construction that minimizes the movement of the adhesive to the edges of the card. Such movement of adhesive is an undesirable characteristic of the card since consumers do not like a sticky substance around the cards and, more particularly, since adhesive may pick up lint or other undesirable materials.

The present invention overcomes the problems associated with unitary, self-contained card constructions, such as represented by the prior art calculators, by providing an outer support frame which surrounds the various layers of the card, a centrally located printed circuit board carrying the display, the keypad, and the necessary electronics for operating the card, top and bottom label sheets having the edges heat sealed to the outer support frame, and adhesive sheets for affixing the top and bottom label sheets to the printed circuit board.

Current consumer transaction cards such as credit and debit cards provide embossed consumer information by impressing the entire thickness of the card with the consumer information. Since the entire card is impressed, the conventional embossed information is structurally strong enough to withstand use in the retailer imprint machines and devices without destruction of the information. Embossing the entire consumer transaction card containing electronics may damage the electronics and, therefore, a problem exists for providing structural strength to this embossed information. In order to provide enduring support to the embossed consumer information located on the bottom label sheet, the embossed areas are limited only to the bottom label sheet and are backfilled to provide structural strength to the embossed consumer information.

BRIEF DESCRIPTION OF THE DRAWING

FIG. 11 is a cross sectional view of the bottom label sheet of FIG. 10 showing the backfill of the embossed consumer information.

DETAILED DESCRIPTION OF THE INVENTION

Figure 1:
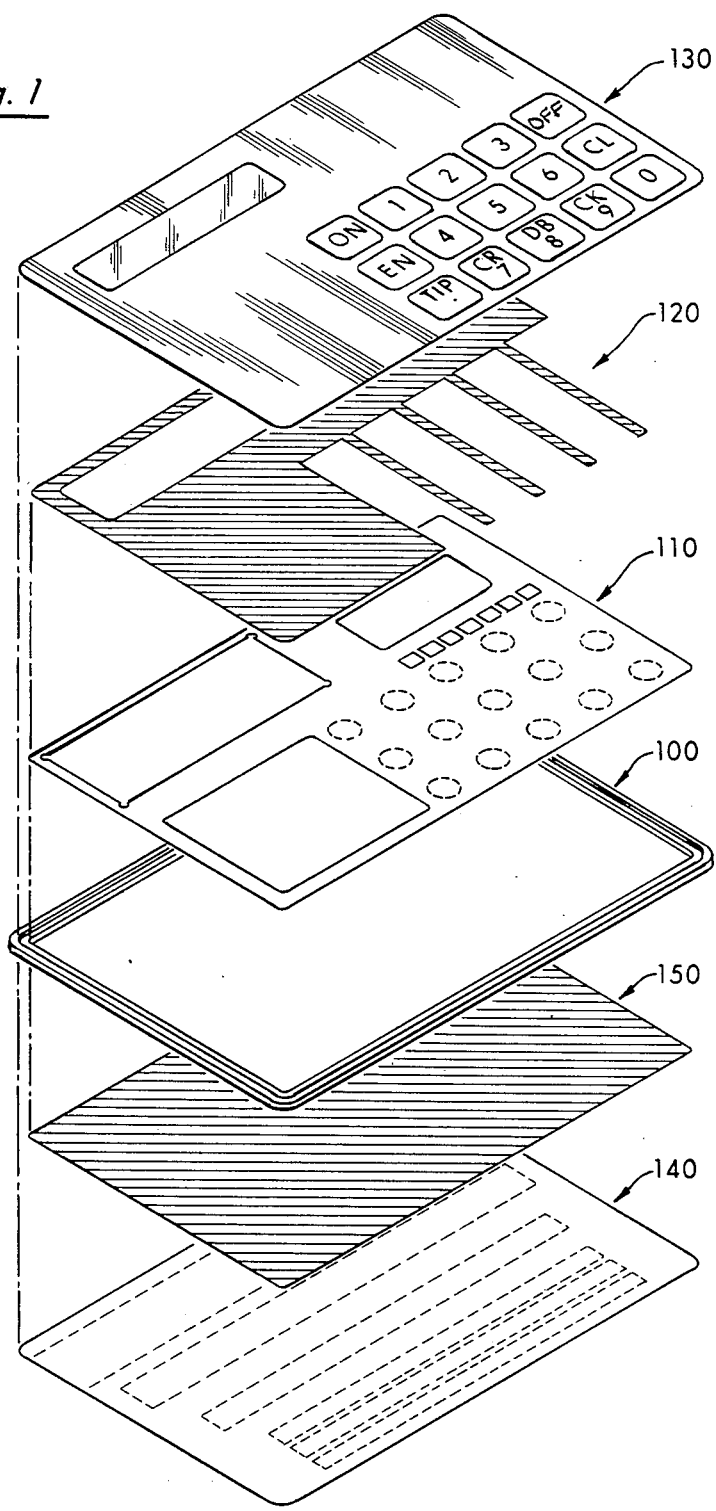
FIG. 1 is an exploded perspective view illustrating the various layers of the unitary, self-contained consumer transaction card of the present invention.

FIG. 1 illustrates the various layers of the unitary, self-contained card of the present invention to include a support frame 100, a printed circuit board 110, an adhesive web sheet 120, a top layer sheet 130, a bottom label sheet 140, and an adhesive sheet 150. Each of these sheets will be discussed in the ensuing paragraphs.

Figure 2:
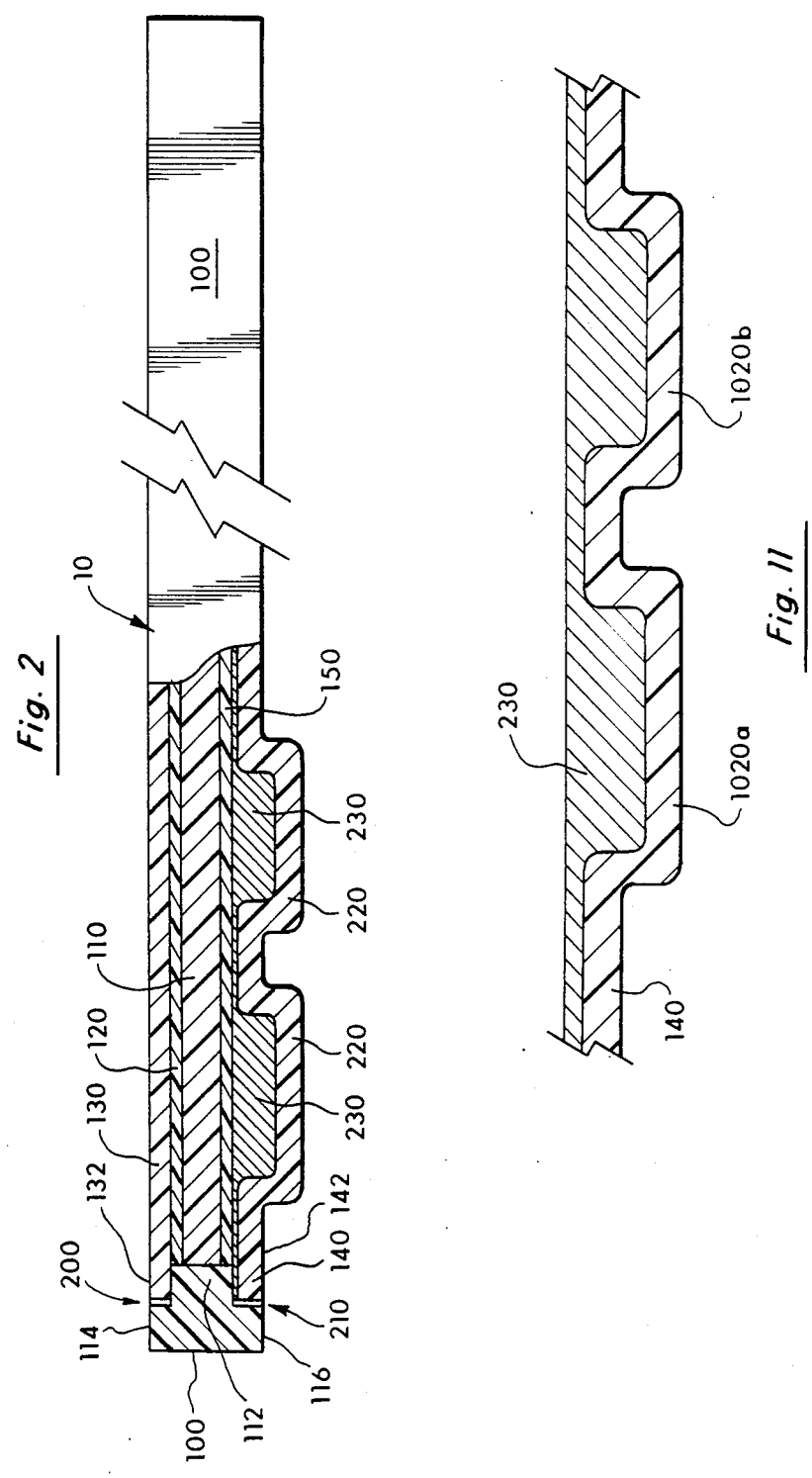
FIG. 2 is a cutaway-cross sectional view of the assembled consumer transaction card of the present invention.

The sheets are assembled as shown in FIG. 2 into a self-contained, unitary, consumer transaction card 10. The outer frame 100 provides structural support to the card 10. The printed circuit board 110 press-fittingly engages an inner support lip 112 of the outer support frame 100. The top label sheet 130 is heat-sealed at area 200 to the upper surface of the support lip 112 so that the upper surface 132 of the top label sheet lies in substantially the same plane as the upper surface 114. The adhesive web 120 holds the upper support sheet 130 to the printed circuit card 110. Likewise, the lower label sheet 140 is heat-sealed to the support frame 100 in the area shown as 210 so that the outer surface 142 of the lower label sheet 140 lies in substantially the same plane as the lower surface 116 of the support frame 100. The embossed consumer information 220 is backfilled with a material 230 to provide structural support to the embossed information 220 when used by consumers to minimize breakdown of the embossed information. An adhesive sheet 150 firmly holds the bottom label 140 to the printed circuit board 110.

Structural strength to the card 10 is provided by the printed circuit board 110 in combination with the support frame 100. Structural strength is also provided to the raised embossed consumer information 200 by the backfill material 230. The movement of the adhesive contained on sheets 120 and 150 towards the edges of the card 10 is prevented by the support frame 100 and the heat-sealing of the top label sheet 130 and the bottom label sheet 140 in areas 200 and 210. Furthermore, enough tolerance is provided in area 200 between the dimensions of the uPper label 130 and the support frame 100 to provide venting to the keypad area, as will be explained more fully.

In FIGS. 3 through 6, the details of the top label sheet 130 are set forth. The top label sheet 130 is preferably made from a polyester material and is approximately 2"×3" in dimension being approximately 3 mils thick. A rectangular shaped clear window 300 is provided against a colored background 310. Formed on the colored background are a plurality of keypad designations 320.

Figure 4:
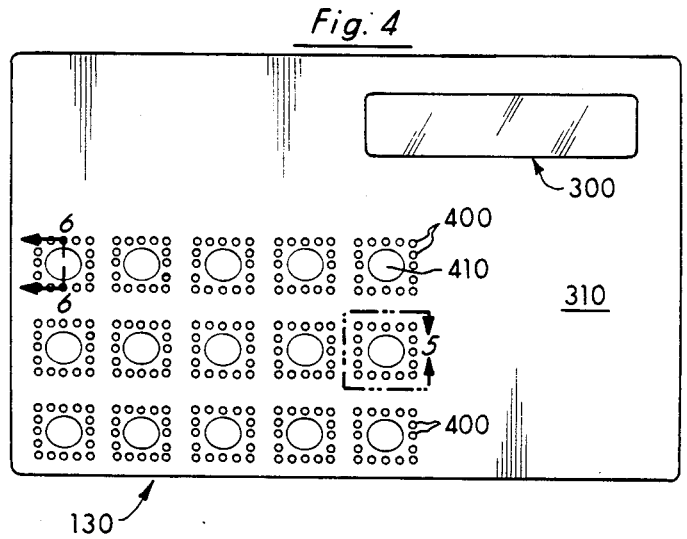
FIG. 4 is the bottom planar view of the top label sheet of the present invention.
Figure 6:
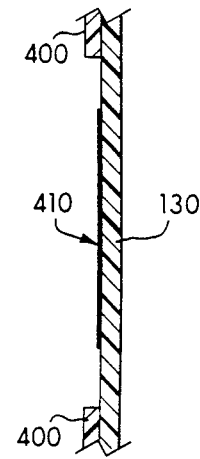
FIG. 6 is a side cross sectional view of an individual keypad area of FIG. 4.
Figure 5:
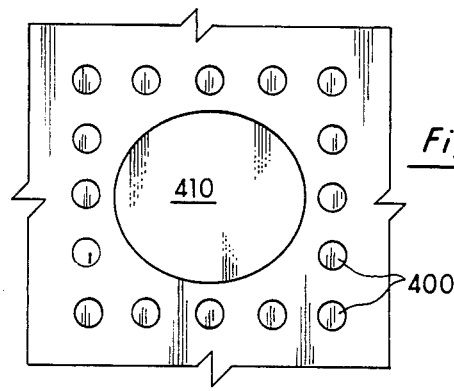
FIG. 5 is an enlarged detail of the individual conductive carbon pads and epoxy spacer dots of the present invention.

The obverse side of the top label sheet 130 is shown in FIG. 4. On the backside of the top label sheet 130 are deposited a plurality of epoxy spacer dots 400 formed around the border of each keypad 320. Centrally disposed in the plurality of epoxy spacer dots 400 are conductive carbon ink elliptically shaped pads 410. The details of the spacer dots 400 and the conductive pads 410 are shown in FIGS. 5 and 6. Each spacer dot is approximately 0.03 inches in diameter and approximately 0.0016 inches high. The conductive pad is a 0.1875 inch by 60 degree ellipse being 0.0004 inches high. The graphics 310 are first printed on the rear side of the card 130 followed by the screening of the carbon ink pads 410 and the epoxy spacer dots 400.

Figure 7:
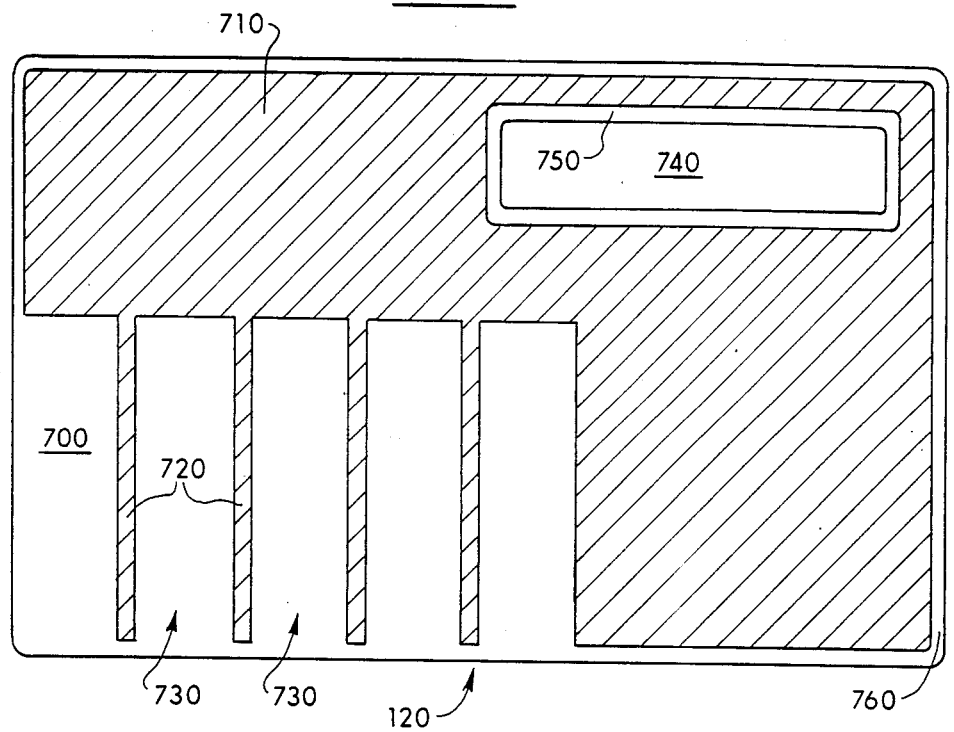
FIG. 7 is the top planar view of the adhesive web sheet located between the top label sheet and the printed circuit board of the present invention.

In FIG. 7, the details of the adhesive web 120 are set forth. The adhesive web sheet 120 is mounted on a poly-paper liner 700 for protection. The liner 700 is removed and discarded when assembled. The clear acrylic adhesive 710 is located on one side of the liner 700. The adhesive area 710 has downwardly extending fingers 720 which are designed to adhere to the top label sheet 130 and the printed circuit board 110 between the rows of the keypads 320. The adhesive fingers 720 are opened at the end 730 to provide a vent path to atmosphere. A cut-out 740 is provided in the adhesive 700 to provide a see-through for the display. An open border 750 and 760 is provided around the window 740 and around the periphery of the top label and does not contain the adhesive material 710. The adhesive material 710 is designed not to come into contact with the carbon pad 410 or the spacer dots 400. Typically, the adhesive web sheet 120 is 0.0015 to 0.002 inches in thickness.

Figure 3:
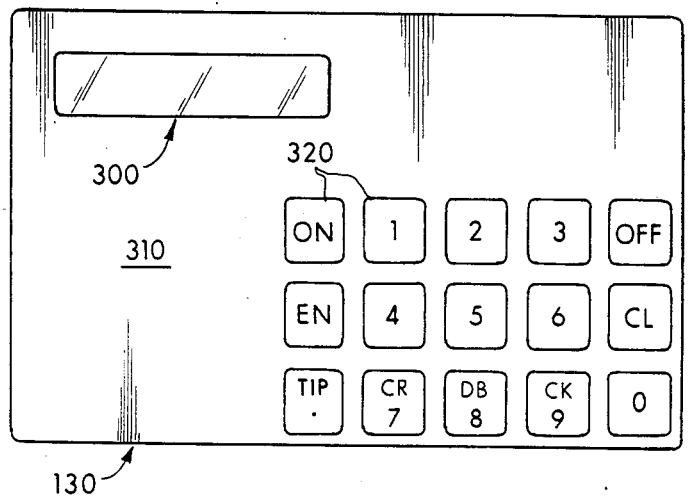
FIG. 3 is the top planar view of the top label sheet of the present invention.
Figure 8:
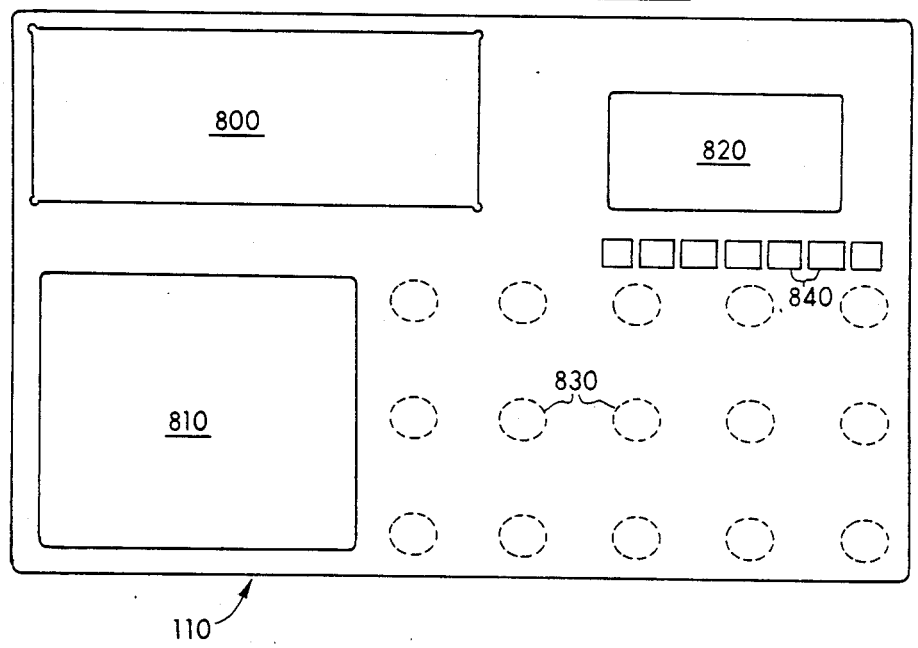
FIG. 8 is the top planar view of the printed circuit board of the present invention.

In FIG. 8 is set forth the details of the printed circuit board of the present invention which is preferably made from a fiber glass laminate number 14 core having an underwriters laboratories rating of FR-4. The thickness of this board is preferably 0.014 inches. In FIG. 8, a window 800 is provided for mounting the display circuitry, a window 810 is provided for mounting the battery assembly, and a window 820 is provided for mounting the microprocessor. The keypad traces 830 are indicated as well as windows for discrete surface mount devices 840. The actual construction of this card 110 will vary from electronic arrangement to electronic arrangement and the present invention is not to be limited to the structure shown in FIG. 8. Such a printed circuit board 110 may, for example, contain the display, the keypad, and the associated electronics as shown in FIG. 3 of the above-identified pending application.

Figure 9:
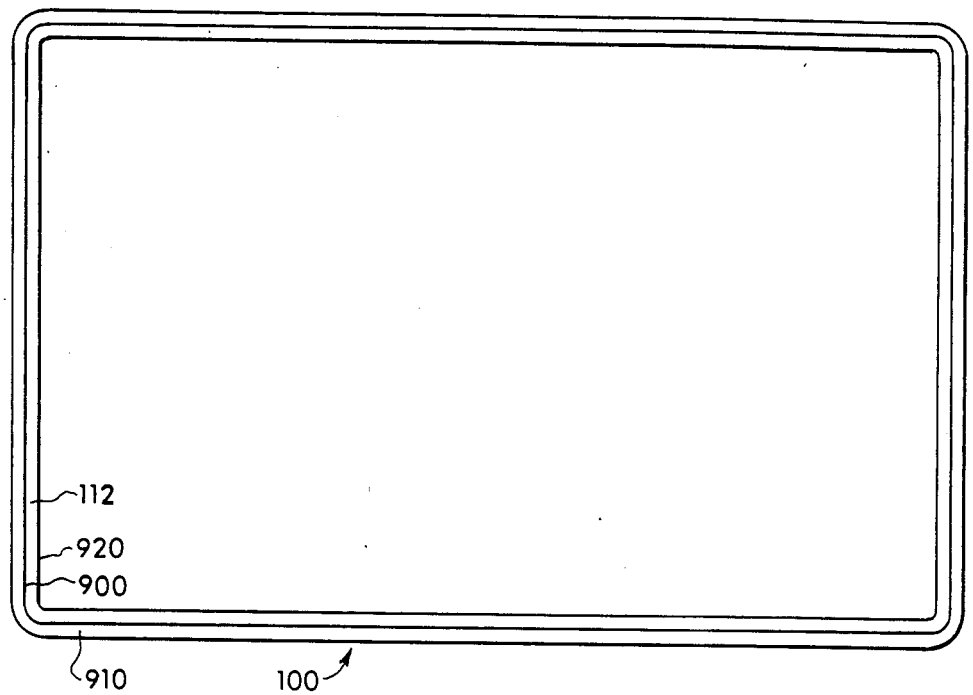
FIG. 9 is a top planar view of the outer support frame of the present invention.

In FIGS. 2 and 9, the details of the support frame 100 are set forth. Support frame 100 contains an inwardly directed support lip 112 centrally located on the inner surface 900 of the 05 support frame 100. The support frame 100 is preferably made from a polycarbonate material and is injection molded as one piece. Typically, the thickness of the outer edge 910 of the support frame 100 is 0.030 inches and the thickness of the inner edge 920 of the support lip 112 is approximately 0.02 inches.

Figure 10:
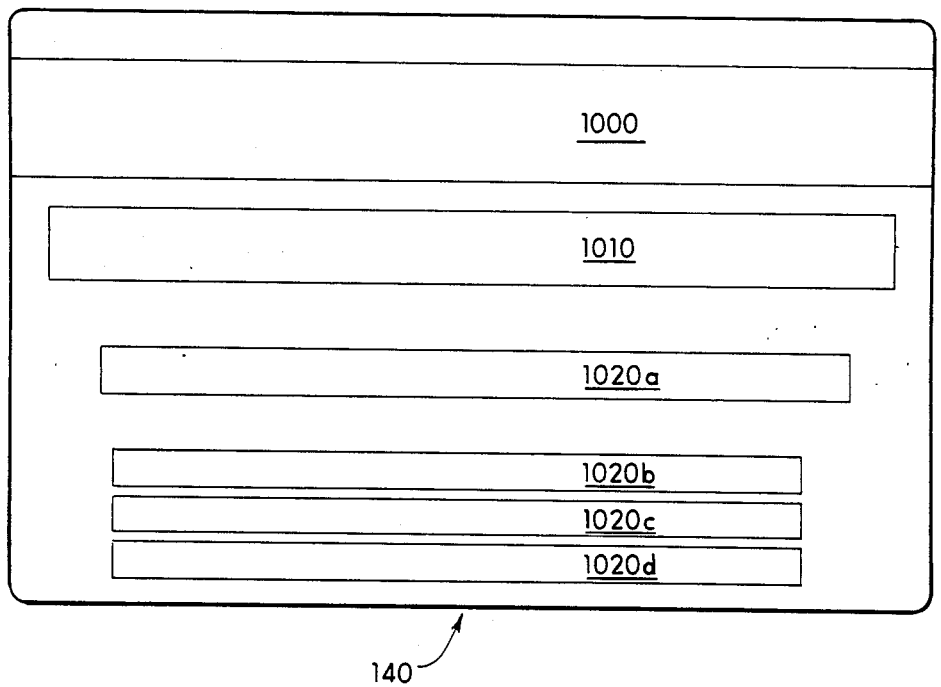
FIG. 10 is a bottom planar view of the bottom label sheet of the present invention.

In FIG. 10, the details of the thin bottom label sheet 140 are set forth to include the conventional magnetic stripe 1000, the conventional signature panel 1010, and the conventional embossed consumer information 1020. This embossed consumer information 1020 may include, for example, an OCR number 1020a, an expiration date 1020b, bank information 1020c, and the name of the consumer 1020d. The bottom label 140 is typically 0.005 inches thick, but with the embossed consumer information 1020 that portion of the card can be as much as 0.025 inches thick. The sheet 140 is preferably made from a polycarbonate, aluminum or polyester material. Because of the thinness of the rear or exterior label sheet 140, a backfill material is provided for structural support. For example, in FIG. 11, the rear label sheet 140 is shown with two embossments 1020a and 1020b having the backfill material 230 inserted into the cavities created by the embossments 1020a and 1020b and rising to approximately 0.020 inches above the surface of the sheet 140. The backfill material 230 is preferably an ultraviolet adhesive which is viscous enough to be rolled into the embossed cavities as shown in FIG. 11. When the adhesive 230 is cured in an ultraviolet oven or the like, it provides structural support and strength to the embossed areas 1020. This differs substantially from conventional practice where the embossed consumer information on debit and credit cards is impressed after the cards are constructed. Of necessity, under the teachings of the present invention, the embossing takes place as the cards are constructed.

The unitary, self-contained consumer transaction card of the present invention is assembled in the following fashion. The top label sheet 130 is printed with suitable graphics. The epoxy spacers 400 and the conductive carbon ink pads 410 are screened onto the rear side of the top label 130 then the adhesive web 120 is placed on next. The frame 100 is then mounted in a suitable jig and the printed circuit board 110 is press-fittingly inserted into the frame 110 to engage the inner surface 920 of the support lip 112. Adhesive web 120 on the rear of the top label 130 is then placed over the printed circuit board 110 so that the edges of sheet 130 are carried on support lip 112. The top label sheet 130 is then heat-sealed to the support frame 100 in area 200. The partially assembled consumer transaction card 10 is then turned over and the battery and the display is inserted into the printed circuit board 110. Any necessary programming to the associated electronics occurs at this stage. The rear adhesive sheet 150 is then applied over the printed circuit board 110. The embossed rear label which, as previously discussed, is backfilled with material 230, cured and then applied over the adhesive sheet 150 and the edges of the bottom label sheet 140 are heat-sealed to the frame 100.

It is to be expressly understood that the unitary, self-contained consumer transaction card of the present invention is constructed according to ANSI specifications which are detailed in:
ANSI×4.16—1983
ANSI×4.13—1983
ANSI×9.1—1984
ANSI—AMERICAN NATIONAL STANDARDS INSTITUTE, INC.
and according to ISO standards which are detailed in
ISO 3554—1976 E
ISO 4909—1978 E
ISO 2894—1980 E
ISO—INTERNATIONAL STANDARD ORGANIZATION While the present invention has been disclosed in a preferred embodiment, it is to be expressly understood that changes and modifications may be made thereto as set forth in the following claims. Further, while the invention has been disclosed for a unitary, self-contained consumer transaction card, it is to be expressly understood that its teachings apply to other types of transaction cards.

I claim:

1. An improved consumer transaction card having a display, a keypad, a magnetic stripe, associated internal electronics for operating said display and said keypad, a signature line and raised embossed consumer information, said improved card comprising:

an outer support frame having a thickness equal to the thickness of said card at the peripheral edge of said card, said frame forming the outer periphery of said card and said frame further having an inwardly extending support lip formed on the inner surface of said frame at a point substantially halfway up the height of said inner surface, a printed circuit board carrying said display, said keypad, and said associated electronics for press-fittingly engaging the inner periphery of said support lip of said frame, a top label sheet having formed thereon a formed clear window for said display and a plurality of formed keypad designations, said top label sheet having an outer peripheral dimension that enables the edges of said top label sheet to be heat-sealed to the upper surface of said support lip of said frame whereby the outer surface of said top label sheet when sealed lies in the same plane as the upper surface of said frame, said top label sheet having formed on its underside:

(a) a plurality of spacer dots formed around each of said keypad designations, and (b) a conductive carbon ink pad formed in the center of each of said plurality of spacer dots, an adhesive web sheet located between said top label sheet and said printed circuit board for firmly engaging said top label sheet to said printed layer of adhesive deposited thereon in a pattern wherein fingers of adhesive are located between the rows of said keypads so that air vents are provided to each row, said adhesive web sheet corresponding in substantial peripheral dimension to the shape of said printed circuit card, a bottom label sheet having placed thereon said magnetic stripe, said signature line and said embossed consumer information, said bottom label sheet having an outer peripheral dimension that enables the edges of said bottom label sheet to be heat-sealed to the lower surface of said support lip of said frame whereby the outer surface of said bottom label sheet around its edges when sealed lies in the same plane as the lower surface of said frame, said embossed consumer information extending above the aforesaid plane, means located between said edges of said bottom label sheet and said support lip for venting said air vents to atmosphere, said venting means being further located between said fingers of adhesive, back fill material inserted on the underside of said bottom label sheet and into said embossed consumer information to provide structural strength to said embossed consumer information, and an adhesive sheet located between said bottom label and said printed circuit board for firmly engaging said bottom label sheet to said printed circuit board, said outer support frame being capable of sealing the peripheral ends of said top label sheet, said adhesive web, said printed circuit board, said adhesive sheet, and said bottom label sheet to prevent the movement on said adhesive from the edges of said card.

2. An improved consumer transaction card having a display, a keypad, a magnetic stripe, associated internal electronics for operating said display and said keypad, a signature line and raised embossed consumer information, said improved card comprising:

an outer support frame having a thickness equal to the thickness of said card at the peripheral edge of said card, said frame forming the outer periphery of said card and said frame further having an inwardly extending support lip formed on the inner surface of said frame at a point substantially halfway up the height of said inner surface, a printed circuit board carrying said display, said keypad, and said associated electronics for press-fittingly engaging the inner periphery of said support lip of said frame, a top label sheet having formed thereon a formed clear window for said display and a plurality of formed keypad designations, said top label sheet having an outer peripheral dimension that enables the edges of said top label sheet to be heat-sealed to the upper surface of said support lip of said frame whereby the outer surface of said top label sheet when sealed lies in the same plane as the upper surface of said frame, said top label sheet having formed on its underside:

(a) a plurality of spacer dots formed around each of said keypad designations, and (b) a conductive carbon ink pad formed in the center of each of said plurality of spacer dots, an adhesive web sheet located between said top label sheet and said printed circuit board for firmly engaging said top label sheet to said printed circuit board, said adhesive web sheet having a formed layer of adhesive deposited thereon in a pattern wherein fingers of adhesive are located between the rows of said keypads so that air vents are provided to each row, said adhesive web sheet corresponding in peripheral dimension to the shape of said printed circuit card, a bottom label sheet having placed thereon said magnetic stripe, said signature line and said embossed consumer information, said bottom label sheet having an outer peripheral dimension that enables the edges of said bottom label sheet to be heat-sealed to the lower surface of said support lip of said frame whereby the outer surface of said bottom label sheet around its edges when sealed lies in the same plane as the lower surface of said frame, said embossed consumer information extending above the aforesaid plane, means located between said edges of said bottom label sheet and said support lip for venting said air vents to atmosphere, said venting means being further located between said fingers of adhesive, and an adhesive sheet located between said bottom label and said printed circuit board for firmly engaging said bottom label sheet to said printed circuit board, said outer support frame being capable of sealing the peripheral ends of said to label sheet, said adhesive web, said printed circuit board, said adhesive sheet, and said bottom label sheet to prevent the movement of said adhesive from the edges of said card.

3. An improved consumer transaction card having a display, a keypad, a magnetic stripe, associated internal electronics for operating said display and said keypad, a signature line and raised embossed consumer information, said improved card comprising:

an outer support frame having a thickness equal to the thickness of said card at the peripheral edge of said card, said frame forming the outer periphery of said card and said frame further having an inwardly extending support lip formed on the inner surface of said frame at a mid-point region on said inner surface, a printed circuit board carrying said display, said keypad, and said associated electronics for press-fittingly engaging the inner periphery of said support lip of said frame, a top label sheet having formed thereon a formed clear window for said display and a plurality of formed keypad designations, said top label sheet having an outer peripheral dimension that enables the edges of said top label sheet to be heat-sealed to the upper surface of said support lip of said frame whereby the outer surface of said top label sheet when sealed lies in the same plane as the upper surface of said frame, an adhesive web sheet located between said top label sheet and said printed circuit board for firmly engaging said top label sheet to said printed circuit board, said adhesive web sheet having a formed layer of adhesive deposited thereon in a pattern wherein fingers of adhesive are located between the rows of said keypads so that air vents are provided to each row, said adhesive web sheet corresponding in peripheral dimension to the shape of said printed circuit card, means located between said edges of said bottom label sheet and said support lip for venting said air vents to atmosphere, said venting means being further located between said fingers of adhesive, a bottom label sheet having placed thereon said magnetic stripe, said signature line and said embossed consumer information, said bottom label sheet having an outer peripheral dimension that enables the edges of said bottom label sheet to be heat-sealed to the lower surface of said support lip of said frame whereby the outer surface of said bottom label sheet around its edges when sealed lies in the same plane as the lower surface of said frame, said embossed consumer information extending above the aforesaid plane, an adhesive sheet located between said bottom label and said printed circuit board for firmly engaging said bottom label sheet to said printed circuit board, said outer support frame being capable of sealing the peripheral ends of said top label sheet, said adhesive web, said printed circuit board, said adhesive sheet, and said bottom label sheet to prevent the movement of said adhesive from the edges of said card.

4. An improved consumer transaction card having a display, a keypad, a magnetic stripe, associated internal electronics for operating said display and said keypad, a signature line and raised embossed consumer information, said improved card comprising:

an outer support frame having a thickness equal to the thickness of said card at the peripheral edge of said card, said frame forming the outer periphery of said card and said frame further having an inwardly extending support lip formed at the mid-point region of the inner surface of said frame, a printed circuit board carrying said display, said keypad, and said associated electronics for engaging the inner periphery of said support lip of said frame, a top label sheet having formed thereon a formed clear window for said display and a plurality of formed keypad designations, said to label sheet having an outer peripheral dimension that enables the edges of said top label sheet to be heat sealed to the upper surface of said support lip of said frame whereby the outer surface of said top label sheet when sealed lies in the same plane as the upper surface of said frame, an adhesive web sheet located between said top label sheet and said printed circuit board for firmly engaging said top level sheet to said printed circuit board, said adhesive web sheet corresponding in peripheral dimension to the shape of said printed circuit card, a bottom label sheet having placed thereon said magnetic stripe, said signature line and said embossed consumer information, said bottom label sheet having an outer peripheral dimension that enables the edges of said bottom label sheet to be heat-sealed to the lower surface of said support lip of said frame whereby the outer surface of said bottom label sheet around its edges when sealed lies in the same plane as the lower surface of said frame, said embossed consumer information extending above the aforesaid plane, back fill material inserted on the underside of said bottom label sheet and into said embossed consumer information to provide structural strength to said embossed consumer information, and an adhesive sheet located between said bottom label and said printed circuit board for firmly engaging said bottom label sheet to said printed circuit board, said outer support frame being capable of sealing the peripheral ends of said top label sheet, said adhesive web, said Printed circuit board, said adhesive sheet, and said bottom label sheet to prevent the movement of said adhesive from the edges of said card.

5. An improved consumer transaction card having a display, associated internal electronics for operating said display, and raised embossed consumer information, said improved card comprising:

an outer support frame having a thickness equal to the thickness of said card at the peripheral edge of said card, said frame forming the outer periphery of said card and said frame further having an inwardly extending support lip formed at the midpoint region of the inner surface of said frame, a printed circuit board carrying said display and said associated electronics for engaging the inner periphery of said support lip of said frame, a top label sheet having formed thereon a formed clear window for said display, said top label sheet having an outer peripheral dimension that enables the edges of said top label sheet to be heat-sealed to the upper surface of said support lip of said frame whereby the outer surface of said top label sheet when sealed lies in the same plane as the upper surface of said frame, an adhesive web sheet located between said top label sheet and said printed circuit board for firmly engaging said top label sheet to said printed circuit board, said adhesive web sheet corresponding in peripheral dimension to the shape of said printed circuit card, a bottom label sheet having placed thereon said embossed consumer information, said bottom label sheet havig an outer peripheral dimension that enables the edges of said bottom label sheet to be heat-sealed to the lower surface of said support lip of said frame whereby the outer surface of said bottom label sheet around its edges when sealed lies in the same plane as the lower surface of said frame, said embossed consumer information extending above the aforesaid plane, back fill material inserted on the underside of said bottom label sheet and into said embossed consumer information to provide structural strength to said embossed consumer information, and an adhesive sheet located between said bottom label and said printed circuit board for firmly engaging said bottom label sheet to said printed circuit board, said outer support frame being capable of sealing the peripheral ends of said top label sheet, said adhesive web, said printed circuit board, said adhesive sheet, and said bottom label sheet to prevent the movement of said adhesive from the edges of said card.

6. An improved consumer transaction card having a display, associated internal electronics for operating said display, and raised embossed consumer information, said improved card comprising:

an outer support frame having a thickness equal to the thickness of said card at the peripheral edge of said card, said frame forming the outer periphery of said card and said frame further having an inwardly extending support lip formed at the midpoint region of the inner surface of said frame, a printed circuit board carrying said display and said associated electronics for engaging the inner periphery of said support lip of said frame, a top label sheet having formed thereon a formed clear window for said display, said top label sheet having an outer peripheral dimension that enables the edges of said top label sheet to be heat-sealed to the upper surface of said support lip of said frame whereby the outer surface of said top label sheet when sealed lies in the same plane as the upper surface of said frame, an adhesive web sheet located between said top label sheet and said printed circuit board for firmly engaging said top label sheet to said printed circuit board, said adhesive web sheet corresponding in peripheral dimension to the shape of said printed circuit card, a bottom label sheet having placed thereon said embossed consumer information, said bottom label sheet having an outer peripheral dimension that enables the edges of said bottom label sheet to be heat-sealed to the lower surface of said support lip of said frame whereby the outer surface of said bottom label sheet around its edges when sealed lies in the same plane as the lower surface of said frame, said embossed consumer information extending above the aforesaid plane, and an adhesive sheet located between said bottom label and said printed circuit board for firmly engaging said bottom label sheet to said printed circuit board, said outer support frame being capable of sealing the peripheral ends of said top label sheet, said adhesive web, said printed circuit board, said adhesive sheet, and said bottom label sheet to prevent the movement of said adhesive from the edges of said card.

7. An improved consumer transaction card having a display, associated internal electronics for operating said display, and raised embossed consumer information, said improved card comprising:

an outer support frame having a thickness equal to the thickness of said card at the peripheral edge of said card, said frame forming the outer periphery of said card, a printed circuit board carrying said display and said associated electronics for engaging the inner periphery of said frame, a top label sheet having formed thereon a formed clear window for said display, means on said inner surface of said frame for enabling the edges of said top label sheet to be heat-sealed to said frame whereby the outer surface of said top label sheet when sealed lies in the same plane as the upper surface of said frame, an adhesive web sheet located between said top label sheet and said printed circuit board for firmly engaging said top label sheet to said printed circuit board, said adhesive web sheet corresponding in peripheral dimension to the shape of said printed circuit card, a bottom label sheet having placed thereon said embossed consumer information, said enabling means being further capable of enabling the edges of said bottom label sheet to be heat-sealed to said frame whereby the outer surface of said bottom label sheet around its edges when sealed lies in the same plane as the lower surface of said frame, said embossed consumer information extending above the aforesaid plane, and an adhesive sheet located between said bottom label and said printed circuit board for firmly engaging said bottom label sheet to said printed circuit board, said outer support frame being capable of sealing the peripheral ends of said top label sheet, said adhesive web, said printed circuit board, said adhesive sheet, and said bottom label sheet to prevent the movement of said adhesive from the edges of said card.

8. The improved consumer transaction card of claim 7 further comprising:

backfill material inserted on the underside of said bottom label sheet and into said embossed consumer information to provide structrual strength to said embossed consumer information.

9. An improved consumer transaction card having a display, associated internal electronics for operating said display, and raised embossed consumer information, said improved card comprising:

an outer support frame having a thickness equal to the thickness of said card at the peripheral edge of said card, said frame forming the outer periphery of said card and said frame further having an inwardly extending support lip formed at the midpoint region of the inner surface of said frame, a printed circuit board carrying said display and said associated electronics, a top label sheet having formed thereon a formed clear window for said display, said top label sheet having an outer peripheral dimension that enables the edges of said top label sheet to be sealed to the upper surface of said support lip of said frame whereby the outer surface of said top label sheet when sealed lies in the same plane as the upper surface of said frame, first means located between said top label sheet and said printer circuit board for firmly engaging said top label sheet to said printed circuit board, a bottom label sheet having placed thereon said embossed consumer information, said bottom label sheet having an outer peripheral dimension that enables the edges of said bottom label sheet to be sealed to the lower surface of said support lip of said frame whereby the outer surface of said bottom label sheet around its edges when sealed lies in the same plane as the lower surface of said frame, said embossed consumer information extending above the aforesaid plane, and second means located between said bottom label and said printed circuit board for firmly engaging said bottom label sheet to said printed circuit board, said outer support frame being capable of sealing the peripheral ends of said top label sheet, said first engaging means, said printed circuit board, said second engaging means, and said bottom label sheet.

* * * * *